(12) United States Patent
Fan et al.

(10) Patent No.: US 8,041,668 B2
(45) Date of Patent: Oct. 18, 2011

(54) METHODS AND APPARATUS FOR CAPTURING AND DETECTING INCONSISTENCIES IN RELATIONAL DATA USING CONDITIONAL FUNCTIONAL DEPENDENCIES

(75) Inventors: Wenfei Fan, Wayne, PA (US); Floris Geerts, Edinburgh (GB); Xibei Jia, Edinburgh (GB); Anastasios Kementsietsidis, Edinburgh (GB)

(73) Assignee: Alcatel Lucent, Paris (FR)

( * ) Notice: Subject to any disclaimer, the term of this patent is extended or adjusted under 35 U.S.C. 154(b) by 954 days.

(21) Appl. No.: 11/771,103

(22) Filed: Jun. 29, 2007

(65) Prior Publication Data

US 2009/0006302 A1    Jan. 1, 2009

(51) Int. Cl.
$G06F\ 17/00$    (2006.01)
$G06N\ 5/02$    (2006.01)
(52) U.S. Cl. ......................................................... 706/48
(58) Field of Classification Search .................. 706/48; 707/E17.048
See application file for complete search history.

(56) References Cited

U.S. PATENT DOCUMENTS

2006/0155743 A1    7/2006    Bohannon et al.

OTHER PUBLICATIONS

'An extension of the relational data model to incorporate ordered domains': Ng, 2001, ACM, Transactions on database systems, vol. 26, No. 3, pp. 344-383.*
'A cost based model and effective heuistic for repairing constraints by value modification': Bohannon, 2005, ACM, 1-59593-060.*
'Data cleaning: problems and current approaches': Rahm, 2000, IEEE.*
'Conditional functional dependencies for capturing data inconsistencies': Fan, 2008, ACM, Transactions on database systems vol. 33, No. 2, article 6.*
Bohannon et al., "Conditional Functional Dependencies for Data Cleaning", 23rd Int'l Conf on Database Engineering (ICDE), 2007.
Fan et al., "Conditional Functional Dependencies for Capturing Data Inconsistencies", ACM Transactions on Database Systems, vol. 33, No. 2 Article 6, pp. 1-48, Jun. 2008.

* cited by examiner

*Primary Examiner* — Omar Fernandez Rivas
*Assistant Examiner* — Peter Coughlan
(74) *Attorney, Agent, or Firm* — Ryan, Mason & Lewis, LLP

(57) ABSTRACT

Methods and apparatus are provided for detecting data inconsistencies. Methods are disclosed for determining whether a set of conditional functional dependencies are consistent; determining a minimal cover of a set of conditional functional dependencies and detecting a violation of one or more conditional functional dependencies in a set of conditional functional dependencies. The conditional functional dependencies comprise one or more constraints that data in a database must satisfy including at least one pattern with data values.

18 Claims, 10 Drawing Sheets

$$Q_\varphi^C \quad \text{select * from } R\ t,\ T_p\ t_p$$
$$\text{where } t[X] \asymp t_p[X] \text{ and } t[A] \not\asymp t_p[A]$$

$$Q_\varphi^V \quad \text{select distinct } X \text{ from } R\ t,\ T_p\ t_p$$
$$\text{where } t[X] \asymp t_p[X] \text{ and } t_p[A] = \text{`\_'}$$
$$\text{group by } X \text{ having count (distinct } A) > 1$$

FIG. 1

|   | CC | AC | PN | NM | STR | CT | ZIP |
|---|---|---|---|---|---|---|---|
| $t_1$: | 01 | 908 | 1111111 | MIKE | TREE AVE. | NYC | 07974 |
| $t_2$: | 01 | 908 | 1111111 | RICK | TREE AVE. | NYC | 07974 |
| $t_3$: | 01 | 212 | 2222222 | JOE | ELM STR. | NYC | 01202 |
| $t_4$: | 01 | 212 | 2222222 | JIM | ELM STR. | NYC | 02404 |
| $t_5$: | 01 | 215 | 3333333 | BEN | OAK AVE. | PHI | 02394 |
| $t_6$: | 44 | 131 | 4444444 | IAN | HIGH ST. | EDI | EH4 1DT |

FIG. 2

(a) Tableau $T_1$ of $\varphi_1$ = (cust:[CC, ZIP] → [STR], $T_1$)

| CC | ZIP | STR |
|---|---|---|
| 44 | – | – |

(b) Tableau $T_2$ of $\varphi_2$ = ([CC, AC, PN] → [STR, CT, ZIP], $T_2$)

| CC | AC | PN | STR | CT | ZIP |
|---|---|---|---|---|---|
| – | – | – | – | – | – |
| 01 | 908 | – | – | MH | – |
| 01 | 212 | – | – | NYC | – |

(c) Tableau $T_3$ of $\varphi_3$ = ([CC, AC] → [CT], $T_3$)

| CC | AC | CT |
|---|---|---|
| – | – | – |
| 01 | 215 | PHI |
| 44 | 141 | GLA |

FIG. 3

ALGORITHM CONSISTENCY

*Input*: A set Σ of CFDs
*Output*: true if Σ is consistent; false otherwise 1. *result* := false;
2. while $V_{finattr}(R) \neq \emptyset$ and not *result* do
3.     *verified* := 0;
4.     Let $\rho \in V_{finattr}(R)$; $V_{finattr}(R) := V_{finattr}(R) - \{\rho\}$;
5.     $t := \rho(\bar{x})$; *consistent* := true;
6.     while *verified* < card(Σ) and *consistent* do /* card(Σ) denotes the cardinality of Σ
7.         Let $\varphi$ be the next CFD in Σ;   /* assume Σ is circular list */
8.         if the application of FD($\varphi$) to $t$ is defined then do;
9.             $t'$ := the result of the application of FD($\varphi$) to $t$;
10.             if $t' = t$ then
11.                 *verified* := *verified*+1;
12.             else *verified* := 0; $t := t'$;
13.         else *consistent* := false;
14.     *result* := *consistent*;
15. return *result*;

FIG. 4

FD1: If $A \in X$, then $(X \to A, t_p)$, where (1) for all $B \in (X \setminus \{A_L, A_R\})$, $t_p[B] = $ '_', and
(2) $t_p[A_L] = t_p[A_R] = $ 'a' for some 'a' $\in dom(A)$, or both are equal to a '_'.

FD2: If $(R : X \to A, t_p)$ and $B \in attr(R)$, then $(R : [X,B] \to A, t'_p)$, where $t'_p[B] = $ '_',
and $t'_p[C] = t_p[C]$ for each $C \in X \cup \{A\}$.

FD3: If (1) $(X \to A_i, t_i)$ such that $t_i[X] = t_j[X]$ for all $i, j \in [1, k]$, (2) $([A_1,...,A_k] \to B, t_p)$ and moreover, (3) $(t_1[A_1],...,t_k[A_k]) \preceq t_p[A_1,...,A_k]$, then $(X \to B, t'_p)$, where $t'_p[X] = t_1[X]$ and $t'_p[B] = t_p[B]$.

FD4: If $([B, X] \to A, t_p)$, $t_p[B] = $ '_', and $t_p[A]$ is a constant, then $(X \to A, t'_p)$, where $t'_p[X \cup \{A\}] = t_p[X \cup \{A\}]$.

FD5: If (1) $\Sigma \vdash_I ([X, B] \to A, t_i)$ for $i \in [1, k]$, (2) $dom(B) = \{b_1,...,b_k, b_{k+1},...,b_m\}$, and $(\Sigma, B = b_l)$ is not consistent except for $l \in [1, k]$, and (3) for $i, j \in [1, k]$, $t_i[X] = t_j[X]$, and $t_i[B] = b_i$, then $\Sigma \vdash_I ([X, B] \to A, t_p)$ where $t_p[B] = $ '_' and $t_p[X] = t_1[X]$.

FIG. 5

*Input*: A set $\Sigma$ of CFDs.
*Output*: A minimal cover of $\Sigma$.

1. if $\Sigma$ is not consistent
2. then return $\emptyset$;
3. for each CFD $\varphi = (X \to A, t_p) \in \Sigma$
4.   for each attribute $B \in X$
5.     if $\Sigma \models (X - \{B\} \to A, (t_p[X - \{B\}], t_p[A]))$
6.       then $\Sigma := \Sigma - \{\varphi\} \cup \{(X - \{B\} \to A, (t_p[X - \{B\}], t_p[A]))\}$;
7. *mincover* := $\Sigma$;
8. for each CFD $\varphi = (X \to A, t_p) \in \Sigma$
9.   if $\Sigma - \{\varphi\} \models \varphi$
10.    then remove $\varphi$ from *mincover*;
11. return *mincover*;

FIG. 6

$Q^C_{\varphi 2}$  select $t$ from cust $t$, $T_2$ $t_p$
where $t[CC] \asymp t_p[CC]$ and $t[AC] \asymp t_p[AC]$ and
$t[PN] \asymp t_p[PN]$ and
($t[STR] \not\asymp t_p[STR]$ or $t[CT] \not\asymp t_p[CT]$ or $t[ZIP] \not\asymp t_p[ZIP]$)

$Q^V_{\varphi 2}$  select distinct $t[CC]$, $t[AC]$, $t[PN]$ from cust $t$, $T_2$ $t_p$
where $t[CC] \asymp t_p[CC]$ and $t[AC] \asymp t_p[AC]$ and $t[PN] \asymp t_p[PN]$
group by $t[CC]$, $t[AC]$, $t[PN]$
having count (distinct $t[STR]$, $t[CT]$, $t[ZIP]$) > 1

FIG. 7

$\varphi_4$ = (cust:[CC, AC, PN] → [STR, CT, ZIP], $T_4$), where $T_4$ is

| CC | AC | PN | STR | CT | ZIP |
|----|-----|----|-----|-----|-----|
| –  | –   | –  | –   | –   | –   |
| 01 | 908 | –  | –   | MH  | –   |
| 01 | 212 | –  | –   | NYC | –   |
| –  | –   | @  | @   | –   | @   |
| 01 | 215 | @  | @   | PHI | @   |

FIG. 8

(a) Tableau $T_\Sigma^X$

| id | CC | AC  | CT |
|----|----|-----|----|
| 1  | –  | –   | @  |
| 2  | 01 | 215 | @  |
| 3  | 44 | 141 | @  |
| 4  | @  | @   | –  |

(b) Tableau $T_\Sigma^Y$

| id | CT  | AC |
|----|-----|----|
| 1  | –   | @  |
| 2  | PHI | @  |
| 3  | GLA | @  |
| 4  | @   | –  |

FIG. 9

| CC | AC | CT  | CT' | AC' |
|----|----|-----|-----|-----|
| @  | @  | NYC | @   | 908 |
| @  | @  | NYC | @   | 212 |
| @  | @  | PHI | @   | 215 |
| @  | @  | EDI | @   | 131 |

*FIG. 10*

| CC | AC | PN | NM | STR | CT | ZIP | $B^C_{\varphi_2}$ | $B^V_{\varphi_2}$ |
|---|---|---|---|---|---|---|---|---|
| 01 | 908 | 1111111 | MIKE | TREE AVE. | NYC | 07974 | 1 | 0 |
| 01 | 908 | 1111111 | RICK | TREE AVE. | NYC | 07974 | 1 | 0 |
| 01 | 212 | 2222222 | JOE | ELM STR. | NYC | 01202 | 0 | 1 |
| 01 | 212 | 2222222 | JIM | ELM STR. | NYC | 02404 | 0 | 1 |
| 01 | 215 | 3333333 | BEN | OAK AVE. | PHI | 02394 | 0 | 0 |
| 44 | 131 | 4444444 | IAN | HIGH ST. | EDI | EH4 1DT | 0 | 0 |

| CC | AC | PN | NM | STR | CT | ZIP | $B^C_{\varphi_2}$ | $B^V_{\varphi_2}$ |
|---|---|---|---|---|---|---|---|---|
| 01 | 212 | 5555555 | TIM | MAIN STR. | CHI | 01202 | 0 | 0 |
| 01 | 212 | 2222222 | SAM | ELM STR. | NYC | 01202 | 0 | 0 |
| 44 | 131 | 4444444 | AL | KING ST. | EDI | EH4 1DT | 0 | 0 |

$Q_\Sigma^C$ select * from $R$ $t$, $T_\Sigma^Z$ $t_p^Z$, $T_\Sigma^W$ $t_p^W$
where $t_p^Z[id] = t_p^W[id]$ and $t[Z] \asymp t_p^Z[Z]$ and $t[W] \not\asymp t_p^W[W]$ $Q_\Sigma^V$ select distinct $Z$ from Macro $t^M$
group by $Z$ having count (distinct $W$)> 1 where Macro is:

select (case $t_p^Z[B_i]$ when '@' then '@' else $t[B_i]$ end) as $B_i$ ...
(case $t_p^W[C_j]$ when '@' then '@' else $t[C_j]$ end) as $C_j$...
from $R$ $t$, $T_\Sigma^Z$ $t_p^Z$, $T_\Sigma^W$ $t_p^W$
where $t_p^Z[id] = t_p^W[id]$ and $t[Z] \asymp t_p^Z[Z]$ and
$(t_p^W[C_1] = $ '_' or ... or $t_p^W[C_n] = $ '_')

FIG. 15

$U_\varphi^C$ update $R^{log}$ $t'$ set $t'[\beta_\varphi^C] = 1$
where $t'[attr(R)]$ in $(Q_\varphi^C)$

FIG. 16

Step 1: insert into $R^{log}$ values $t$

Step 2: update $R^{log}$ $t'$ set $t'[\beta_\varphi^C] = 1$
where $t' = t$ and
exists (select * from $T_p$
where $t_p[X] \asymp t'[X]$ and $t_p[A] \not\asymp t'[A]$)

Step 3: update $R^{log}$ $t'$ set $t[\beta_\varphi^V] = 1, t'[\beta_\varphi^V] = 1$
where $t'[X] = t[X]$ and $t'[A] \neq t[A]$ and
exists (select * from $T_p$ $t_p$
where $t_p[X] \asymp t[X]$ and $t_p[A] = $ '_')

FIG. 17

Step 1: update $\Delta R^{log}\ t'$ set $t'[\beta_\varphi^C] = 1$
        where $t'[\text{attr}(R)]$ in $(Q_\varphi^C)$ Step 2: update $R^{log}\ t'$ set $t'[\beta_\varphi^V] = 1$
        where $t'[\beta_\varphi^C] = 0$ and $t'[\beta_\varphi^V] = 0$ and
              exists (select * from $T_p\ t_p$
                      where $t_p[X] \asymp t[X]$ and $t_p[A] = \text{'\_'}$) and
              exists (select * from $\Delta R^{log}\ t''$
                      where $t''[X] = t'[X]$ and $t''[A] \neq t'[A]$) and Step 3: update $\Delta R^{log}\ t'$ set $t'[\beta_\varphi^V] = 1$
        exists (select * from $R^{log}\ t''$
                where $t''[X] = t'[X]$ and $t''[\beta_\varphi^V] = 1$)

Step 4: update $\Delta R^{log}\ t'$ set $t'[\beta_\varphi^V] = 1$
        $t'[\beta_\varphi^C] = 0$ and $t'[\beta_\varphi^V] = 0$ and
        $t'[X]$ in (select $X$ from $\Delta R^{log}\ t''$, $T_p\ t_p$
                    where $t''[\beta_\varphi^C] = 0$ and $t''[\beta_\varphi^V] = 0$ and $t''[X] \asymp t_p[X]$
                          $t_p[A] = \text{'\_'}$
                    group by $X$
                    having count (distinct $A$) > 1)

Step 5: insert into $R^{log}$ values (select * from $\Delta R^{log}$)

METHODS AND APPARATUS FOR CAPTURING AND DETECTING INCONSISTENCIES IN RELATIONAL DATA USING CONDITIONAL FUNCTIONAL DEPENDENCIES

FIELD OF THE INVENTION

The present invention relates generally to data cleaning techniques, and more particularly, to methods and apparatus for detecting data inconsistencies.

BACKGROUND OF THE INVENTION

Recent statistics reveals that "dirty" data costs businesses in the United States billions of dollars annually. It is also estimated that data cleaning, a labor-intensive and complex process, accounts fox 30%-80% of the development time in a typical data warehouse project. These statistics highlight the need for data-cleaning tools to automatically detect and effectively remove inconsistencies and errors in the data.

One of the most important questions in connection with data cleaning is how to model the consistency of the data, i.e., how to specify and determine whether the data is clean. This calls for appropriate application-specific integrity constraints to model the fundamental semantics of the data Commercially-available ETL (extraction, transformation, loading) tools typically have little built-in data cleaning capability, and a significant portion of the cleaning work has to still be done manually or by low-level programs that are difficult to write and maintain. A bulk of prior research has focused on the merge-purge problem for the elimination of approximate duplicates, or on detecting domain discrepancies and structural conflicts.

There has also been recent work on constraint repair that specifies the consistency of data in terms of constraints, and detects inconsistencies in the data as violations of the constraints. However, previous work on constraint repair is mostly based on traditional dependencies (e.g., functional and full dependencies), that were developed mainly for schema design, but are often insufficient to capture the semantics of the data.

A need exists for improved methods and apparatus for detecting data inconsistencies.

SUMMARY OF THE INVENTION

Generally, methods and apparatus are provided for detecting data inconsistencies. According to one aspect of the invention, a method is disclosed for determining whether a set of conditional functional dependencies are consistent. The conditional functional dependencies comprise one or more constraints that data in a database must satisfy including at least one pattern with data values. The method comprises the steps of obtaining a pattern tableau comprising a tableau tuple having a plurality of attributes including one or more finite domain attributes, wherein the one or mole finite domain attributes are instantiated with a value; applying one or more of the conditional functional dependencies in the set to the pattern tableau to instantiate an attribute of the tableau tuple with a constant; and determining that at least two conditional functional dependencies are inconsistent when an attribute is instantiated with two different constants. The method is generally repeated for possible values of the one or mole finite domain attributes in the tableau tuples and the applying step continues until no further changes are induced by the application of a conditional functional dependency to the pattern tableau.

According to another aspect of the invention, a method is disclosed for determining a minimal cover of a set of conditional functional dependencies. The method comprises the steps of determining whether the set of conditional functional dependencies is consistent; removing redundant attributes in the set of conditional functional dependencies; and removing redundant conditional functional dependencies from the set of conditional functional dependencies. The redundant attributes can be removed by of applying one or more chase rules based on a generalization of Armstrong's Axioms.

According to yet another aspect of the invention, a method is disclosed for detecting a violation of one or more conditional functional dependencies in a set of conditional functional dependencies. The method comprises the steps of representing the one or mole conditional functional dependencies in a pattern tableau; applying a first query to at least one of the conditional functional dependencies, wherein the first query detects one or more single-tuple violations, wherein a single-tuple violation comprises a tuple in the database that match a pattern tuple from the pattern tableau on a first set of attributes but does not match a second set of attributes due to a difference in one or more constant values; and applying a second query to at least one of the conditional functional dependencies, wherein the second query detects one or more multiple-tuple violations, wherein a multiple-tuple violation comprises at least two tuples in the database that agree on the first set of attributes and match a pattern tuple from a pattern tableau but the at least two tuples disagree on the second set of attributes. The first and second queries may be SQL queries.

A more complete understanding of the present invention, as well as further features and advantages of the present invention, will be obtained by reference to the following detailed description and drawings.

BRIEF DESCRIPTION OF THE DRAWING

FIG. 1 is a table illustrating an instance of an exemplary customer relation;

FIG. 2 illustrates tableaus corresponding to a number of exemplary conditional functional dependencies;

FIG. 3 illustrates exemplary psuedocode for an exemplary consistency checking algorithm incorporating features of the present invention;

FIG. 4 illustrates a number of exemplary inference rules incorporating features of the present invention;

FIG. 5 provides exemplary pseudocode for an algorithm, MinCover, that computes a minimal cover in accordance with an aspect of the invention;

FIG. 6 illustrates a pair of SQL queries $Q_{\phi_2}^C$ and $Q_{\phi_2}^V$ that determine whether or not a cust instance I satisfies the conditional functional dependency $\phi_2$ of FIG. 2;

FIG. 7 illustrates the merging of CFDs $\phi_2$ and $\phi_3$ of FIG. 2;

FIG. 8 illustrates merged tableaus $T_\Sigma^Z$ and $T_\Sigma^W$ for conditional functional dependencies;

FIG. 9 illustrates the result of joining the fourth tuple of tableaus $T_\Sigma^Z$ and $T_\Sigma^W$ in FIG. 8 with the customer relation of FIG. 1;

FIG. 10 illustrates the customer relation instance of FIG. 1 after its schema has been extended with logging violations for CFD $\phi_2$;

FIG. 11 illustrates a customer relation instance used for batch insertion; and

FIG. 14 provides SQL statements for detecting inconsistencies for multiple CFDs;

FIG. 15 provides a SQL statement for initializing log information for single tuple violations;

FIG. 16 provides SQL statements for updating log information for single tuple insertions; and FIG. 17 provides SQL statements for updating log information for batch tuple insertion.

DETAILED DESCRIPTION

Figures 12, 13:
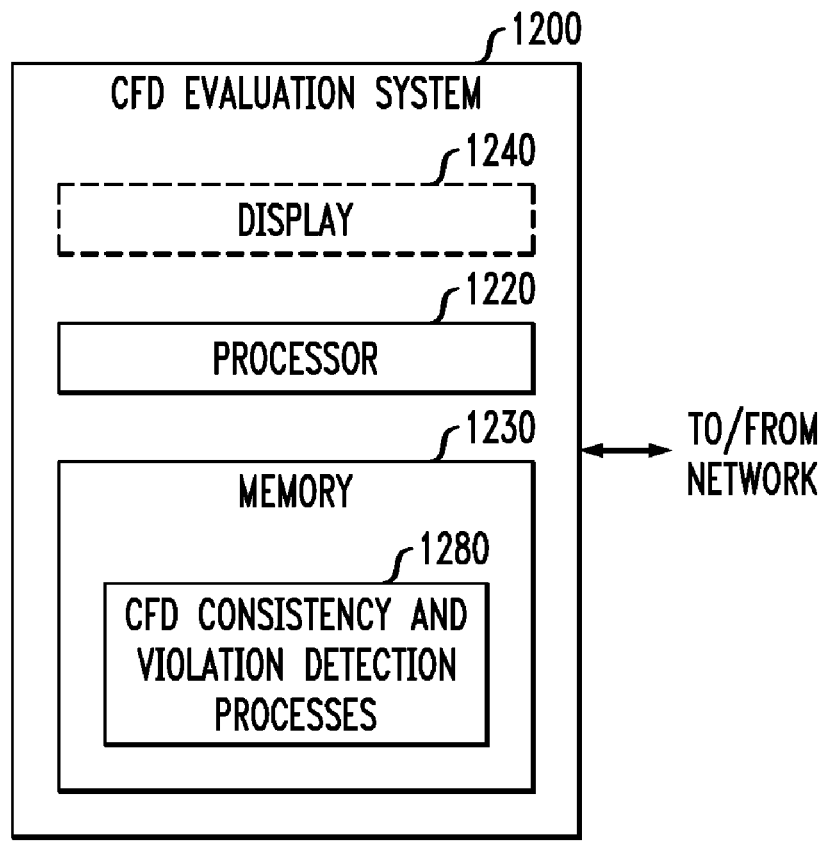
FIG. 12 is a block diagram of a system that can implement the processes of the present invention.
FIG. 13 provides SQL statements for detecting inconsistencies for a single CFD.

The present invention extends the notion of traditional functional dependencies (FDs), discussed below, to provide conditional functional dependencies (CFDs) that are capable of capturing the notion of "correct data." According to one aspect of the invention, techniques are provided for analyzing the consistency of CFDs. An inference system is provided for the implication analysis of CFDs, which is analogous to Armstrong's Axioms for traditional FDs. Another aspect of the invention provides SQL techniques for detecting CFD violations.

Example 1.1

Consider a relation schema cust(CC,AC,PN,NM,STR,CT, ZIP), that specifies a customer in terms of the customer's phone (country code (CC), area code (AC), phone number (PN)), name (NM), and address (street (STR), city (CT), zip code (ZIP)).

Traditional functional dependencies (FDs) on a cust relation may include:
$f_1$: [CC,AC,PN]→[STR,CT,ZIP]
$f_2$: [CC,AC]→[CT]

Recall the semantics of an FD: $f_2$ requires that customer records with the same country-code, area-code and phone number also have the same street, city and zip-code. Similarly, $f_2$ requires that two customer records with the same country- and area-codes also have the same city name. Traditional FDs are to hold on all the tuples in the relation. In contrast, the following constraint is supposed to hold only when the country code is 44. That is, for customers in the uk, ZIP determines STR:

$\phi_0$: [CC=44,ZIP]→[STR]

In other words, $\phi_0$ is an FD that is to hold on the subset of tuples that satisfies the pattern "CC=44", rather than on the entire cust relation. It is generally not considered an FD in the standard definition since $\phi_0$ includes a pattern with data values in its specification.

The following constraints are again not considered FDs:
$\phi_1$: [CC=01,AC,=908,PN]→[STR,CT=$_{MH}$ ZIP]
$\phi_2$: [CC=01,AC,=212,PN]→[STR,CT=$_{NYC}$ ZIP]
$\phi_3$: [CC=01,AC,=215]→[CT=$_{PHI}$]

The first constraint $\phi_1$ assures that only in the US (country code 01) and for area code 908, if two tuples have the same PN, then they must have the same SIR and ZIP values and furthermore, the city must be MH. Similarly, $\phi_2$ assures that if the area code is 212 then the city must be NYC; and $\phi_3$ specifies that for all tuples in the US and with area code 215, their city must be PHI (irrespective of the values of the other attributes).

Observe that $\phi_1$ and $\phi_2$ refine the standard $f_1$ given above, while $\phi_3$ refines the FD $f_2$. This refinement essentially enforces a binding of semantically related data values. Note that while tuples $t_1$ and $t_2$ in FIG. 1 do not violate $f_1$, they violate its refined version $\phi_1$, since the city cannot be NYC if the area code is 908.

In this example, the constraints $\phi_0$, $\phi_1$, $\phi_2$ and $\phi_3$ capture a fundamental part of the semantics of the data. However, they cannot be expressed as standard FDs and are not considered in previous work on data cleaning. Constraints that hold conditionally may arise in a number of domains. For example, an employee's pay grade may determine his or her title in some parts of an organization but not in others; an individual's address may determine his or her tax late in some countries while in other's it may depend on his or her salary, etc. Further, dependencies that apply conditionally appear to be particularly needed when integrating data, since dependencies that hold only in a subset of sources will hold only conditionally in the integrated data.

In response to the practical need for such constraints, one aspect of the present invention provides an extension of traditional FDs, referred to herein as conditional functional dependencies (CFDs), that are capable of capturing the notion of "correct data" in these situations. A CFD extends an FD by incorporating a pattern tableau that enforce binding of semantically related values. Unlike its traditional counterpart, the CFD is required to hold only on tuples that satisfy a pattern in the pattern tableau, rather than on the entire relation. For example, all the constraints encountered so far can be expressed as CFDs. A formal framework for modeling CFDs is provided below.

Since CFDs are an extension of standard FDs, it is natural to ask whether or not CFDs can be reasoned about along the same lines as their FD counterpart. For example, does a set $\Sigma$ of CFDs make sense, i.e., are the CFDs consistent (is there a nonempty database that satisfies $\Sigma$)? Is there an inference system, analogous to Armstrong's Axioms for FDs, to effectively determine whether or not a set of CFDs implies (entails) another CFDs? These are the classical consistency and implication problems typically associated with integrity constraints. These problems are not only fundamental to CFDs, but are also important for data cleaning Indeed, if an input set $\Sigma$ of CFDs is found inconsistent, then there is no need to check (validate) the CFDs against the data at all. Further, it helps the user discover errors in CFD specification. When $\Sigma$ is consistent, an effective implication analysis would allow finding a minimal cover $\Sigma_{mc}$ of $\Sigma$ that is equivalent to $\Sigma$ but contains no redundant CFDs, patterns or attributes; it is typically more efficient to use $\Sigma_{mc}$ instead of $\Sigma$ when detecting and removing inconsistencies from the data.

According to another aspect of the present invention, techniques are provided for the consistency analysis of CFDs. The static analysis of CFDs introduces new challenges. Indeed, a set of CFDs may be inconsistent, i.e., there may not exist a nonempty database satisfying the CFDs, a problem not encountered when dealing with traditional FDs. The consistency problem for CFDs is NP-complete in general, but it is in PTIME when either the database schema is predefined or no attributes involved in the CFDs have a finite domain.

According to yet another aspect of the present invention, an inference system is provided for the implication analysis of CFDs, which is analogous to but is more involved than Armstrong's Axioms for FDs. Compared to standard FDs for which the implication problem is in linear-time, the implication analysis for CFDs is co NP-complete. A special case is identified when the implication problem is in PTIME. Based on these, a technique is provided for computing a minimal cover of a set of CFDs. These results are not only useful for data cleaning as an optimization technique by minimizing the input CFDs, but also yield a CFD theory analogous to the theory of FDs.

Yet another aspect of the present invention provides SQL techniques for detecting CFD violations. Since CFDs incorporate data values, they may in some cases be physically large, and straightforward techniques may lead to a very large number of detection queries. Techniques are disclosed for merging and efficiently checking a set of CFDs even with a very large number of conditions. These guarantee: (a) a single pair of SQL queries are generated, with a bounded size independent of the pattern tableaus in the CFDs, and (b) only two passes of the database are needed.

Furthermore, techniques are provided to incrementally detect CFD violations, as the underlying instance changes due to the insertions of deletions of tuples.

In this section, conditional functional dependencies (CFDs) are defined. Consider a relation schema R defined over a fixed set of attributes, denoted by attr(R).

Syntax. A CFD l on R is a pair $(R:X \rightarrow Y, T_p)$, where (1) X, Y are sets of attributes from attr(R), (2) $R:X \rightarrow Y$ is a standard FD, referred to as the FD embedded in l; and (3) $T_p$ is a tableau with all attributes in l, referred to as the pattern tableau of l, where each for each A in X or Y and each tuple $t \in T_p$, t[A] is either a constant 'a' in the domain dom(A) or A, or an unnamed variable '–'.

If A occurs in both X and Y, $t \lfloor A_t \rfloor$ and $t \lfloor t_R \rfloor$ indicate the occurrence of A in X and Y, respectively, and the X and Y attributes are separated in a pattern tuple with '||'. l is written as $(X \rightarrow Y, T_p)$ when R is clear from the context.

Example 2.1

The constraints $\phi_0, f_1, \phi_1, f_2, \phi_3$ on the cust table given in Example 1.1 can be expressed as CFDs $l_1$ (for $\phi_0$), $l_2$ (for $f_1$, $\phi_1$ and $\phi_2$, one per line, respectively) and $l_3$ for $f_2$, $\phi_2$ and an additional [CC=44, AC=141]→[CT=GLA] to be used below), as shown in FIG. 2.

If both data and constraints in are represented a uniform tableau format, then at one end of the spectrum are relational tables which consist of data values without logic variables, and at the other end are traditional constraints which are defined in terms of logic variables but without data values, while CFDs are in the between.

Semantics. For a pattern tuple $t_c$ in $T_p$, an instantiation p is defined to be a mapping from $t_c$ to a data tuple with no variables, such that for each attribute A in X∪X, if $t_c[A]$ is '–', p maps it to a constant in dom(A), and if $t_c[A]$ is a constant 'a', p maps it to the same value 'a'. For example, for $t_c[A, B] = (a,-)$, one can define an instantiation p such that $p(t_c[A, B]) = (a, b)$, which maps $t_c[A]$ to itself and $t_c[B]$ to a value b in dom(B).

A data tuple t is said to match a pattern tuple $t_c$, denoted by $t = t_c$, if there is an instantiation p such that $p(t_c) = t$. For example, $t[A, B] = (a, b) = (a, b) = t_c[A, B]$ (a,–). It is noted that the "=" symbol should be replaced by the match symbol, as equality and match are different concepts, as would be apparent to a person of ordinary skill in the art.

A relation I of R satisfies the CFD l, denoted by I⊨l, if for each pair of tuples $t_1, t_2$ in the relation I, and for each tuple $t_c$ in the pattern tableau $t_p$ of l, $t_1[X] = t_2[X] = t_c[X]$, then $t_1[Y] = t_2[Y] = t_c[Y]$. That is, if $t_1[X]$ and $t_2[X]$ are equal and in addition, they both match the pattern $t_c[Y]$. Moreover, if Σ is a set of CFDs, we write I⊨Σ if l⊨l, for each CFD l∈Σ.

Example 2.2

The cust relation in FIG. 1 satisfies $l_1$ and $l_2$ of FIG. 2. However, it does not satisfy $l_2$. Indeed, tuple $t_1$ violates the pattern tuple $t_c = (01,908,\_||\_,MH,-)$ in tableau $t_1$[STR,CT, ZIP]≠(–,MH,–) since $t_1$[CT] is NYC instead of MH; similarly for $t_2$.

This example indicates that while violation of a standard FD requires two tuples, a single tuple may violate a CFD.

Two special cases of CFDs are worth mentioning. First, a standard FD $X \rightarrow Y$ can be expressed as a CFD $(X \rightarrow Y, T_p)$ in which $T_p$ contains a single tuple consisting of '–' only. For example, if we let $T_3$ of $l_3$ in FIG. 2 contain only (–, –, –), then it is the CFD representation of the FD $f_2$ given in Example 1.1. Second, an instance-level FD $X \rightarrow Y$ is a special CFD $(X \rightarrow Y, T_p)$ where $T_p$ consists of a single tuple consisting of only data values.

Consistency Analysis of Conditional Functional Dependencies

Any set of standard FDs can be specified, without worrying about consistency. This is no longer the case for CFDs, as illustrated by the example below.

Example 3.1

Consider CFD $\psi_1 = (R:[A] \rightarrow [B], T_1)$, where $T_1$ consists of two pattern tuples (\_||b) and (\_||c). Then, no nonempty instance I of R can possibly satisfy $\psi_1$. Indeed, for any tuple t in I, while the first pattern tuple says that t[B] must be b no matter what value t[A] has, the second pattern requires t[B] to be c.

Now assume that dom(A) is bool. Consider two CFDs $\psi_2 = ([A] \rightarrow [B], T_2)$ and $\psi_3 = ([B] \rightarrow >[A], T_3)$, where $T_2$ has two patterns (true||$b_1$), (false||$b_2$), and $T_3$ contains ($b_1$||false) and ($b_2$||true). While $\psi_2$ and $\psi_3$ can be separately satisfied by a nonempty instance, there exists no nonempty instance I such that I ⊨ {$\psi_2, \psi_3$}. Indeed, for any tuple t in I, no matter what Boolean value t[A] has, $\psi_2$ and $\psi_3$ together force t[A] to take the other value from the finite domain bool. This indicates that attributes with a finite domain may complicate the consistency analysis. Indeed, suppose that dom(A) contains one extra constant, say maybe Then the instance I={(maybe, $b_3$)}, for $b_3$ different from both $b_1$ and $b_2$, clearly satisfies both $\psi_2$ and $\psi_3$.

A set Σ of CFDs on a schema R is said to be consistent if there exists a nonempty instance I of R such that I⊨Σ. The consistency problem for CFDs is to determine, given a set Σ of CFDs defined on a relation schema R, whether Σ is consistent.

This is a nontrivial problem that was not encountered when dealing with standard FDs. Indeed, this problem is intractable if some attributes involved in the CFDs have a finite domain, which, as Example 3.1 shows, complicate the consistency analysis. The consistency problem for CFDs is NP-complete.

A stronger notion of consistency might be considered, as suggested by the following example. Consider a CFD $\psi_4 = (R:[A] \rightarrow [B], T_4)$, where $T_4$ consists of pattern tuples (aPb) and (aPc) and b≠c. There is obviously a nonempty instance I of R that satisfy $\psi_4$. However, the conflict between the pattern tuples in $\psi_4$ becomes evident if I contains a tuple t with t[A]=a. Indeed, the first pattern tuple forces t[B] to be b while the second pattern tuple requires t[B] to be c. In light of this, one might want to ensure that every CFD in Σ does not conflict with the rest of Σ no matter over what instances of R. This can be guaranteed by requiring for each CFD $\phi = (R:X \rightarrow Y, t_p) \in \Sigma$ the existence of an instance $I_\phi \models \Sigma$ and moreover $I_\phi$ contains a tuple t such that $t[X] = t_p[X]$. However, this stronger notion of consistency can be checked using the "classical" notion of consistency as follows. Suppose it is desired to check the strong consistency of $\Sigma$. Let $\phi=(X\to A,t_p)\epsilon\Sigma$ and let $X_c \supseteq X$ be the set of attributes for which $t_p[X_c]$ consists of constants only. Then, for each $\phi=(X\to A,t_p)\epsilon\Sigma$, the consistency of $\Sigma \cup \{([C]\to[C],(\_\|t_p[C]))|C\epsilon X_c\}$ is checked. If all these sets are consistent, then $\Sigma$ is strongly consistent, otherwise it is not. For example, for $\Sigma=\{\psi_4\}$ it is sufficient to check the consistency of $\Sigma \cup \{([A]\to[A],(\_\|a))\}$ to identify that $\Sigma$ is not strongly consistent. From the above it follows that checking strong consistency is also NP-complete. Moreover, the consistency checking algorithm presented below can be easily modified to test strong consistency.

A Consistency Checking Algorithm

For data cleaning in practice, the relational schema is often fixed, and only CFDs vary and are treated as the input. FIG. 3 illustrates exemplary psuedocode for an exemplary consistency checking algorithm 300, Consistency, for checking the consistency of a given set of CFDs using a particular kind of chase procedure. For a more detailed discussion of chase for FDs, see, for example, S. Abiteboul et al., "Foundation of Databases," Addison-Wesley (1995) or P. Bohannon et al., "Conditional Functional Dependencies for Data Cleaning," 23rd Int'l Conf. on Database Engineering (ICDE), 2007 and Fan et al., "Conditional Functional Dependencies for Capturing Data Inconsistencies", downloadable from http://www.lfcs.inf.ed.ac.uk/research/database/publications/efd-full.pdf, each incorporated by reference herein.

To simplify the discussion, CFDs of the form $(R:X\to A,T_p)$ are considered, where A is a single attribute and $T_p$ consists of a single pattern tuple $t_p$, written as $(R:X\to A,t_p)$. This does not lose generality since a CFD of the general form $\phi=(R:X\to Y, T_p)$ is equivalent to a set $\Sigma_\phi$ of CFDs of the form above such that for each $A\epsilon Y$ and $t_p\epsilon T_p$, $(R:X\to A,t_p[X\|A])$ is in $\Sigma_\phi$. That is, for any instance I of R, $I\Sigma_\phi$ if and only if I $\phi$. Note that each pattern $t_p$ indicates a CFD. For a set $\Sigma$ of CFDs of this form, card($\Sigma$) is the number of CFDs in $\Sigma$, which is the same as the number of pattern tuples in $\Sigma$.

Observe that inconsistencies can only be caused by the presence of CFDs that have a constant in their right hand side. Indeed, let $\Sigma$ be a set of CFDs and denote by $\Sigma_c$ the set of CFDs $\phi=(R:X\to A,t_p)$ in $\Sigma$ such that $t_p[A]=a$ for some constant 'a' in dom(A). It is now verified that $\Sigma$ is consistent iff $\Sigma_c$ is consistent. Clearly, the consistency of $\Sigma$ implies the consistency of $\Sigma_c$. For the other direction, let I be an instance such that I $\Sigma_c$. $\{t\}$ $\Sigma_c$ for any tuple $t\epsilon I$. Let $\psi=(R:Y\to B, s_p)\epsilon\Sigma$ such that $t_p[B]$'_'. Note that such CFDs are trivially satisfied on single-tuple instances and therefore $\{t\}$ $\Sigma_c\cup\{\psi\}$ for any such $\psi\epsilon\Sigma$. As a result, $\{t\}$ $\Sigma$ and therefore can restrict to CFDs in $\Sigma_x$ for checking the consistency of a set of CFDs $\Sigma$.

Without loss of generality, it is assumed that $\Sigma=\Sigma_c$. Denote by var an infinite set of (named) variables. Consider a "tuple tableau" $\bar{x}=(x_1, \ldots, x_n)$ that consists of a variable $x_i\epsilon$var for each attribute $A_i\epsilon$attr(R). Denote by finattr(R) the set of attributes in attr(R) that have a finite domain. A finite domain valuation $\rho$ of $\bar{x}$ is a mapping from the finite domain variables, i.e., the variables in $\bar{x}$[finattr(R)], to constants in their respective finite domains. $V_{finattr(R)}$ denoteS the set of all finite domain valuations of $\bar{x}$. Moreover, $\rho(\bar{x})$ denotes the result of applying $\rho\epsilon V_{finattr(R)}$ to $\bar{x}$.

For each $\rho\epsilon V_{finattr(R)}$, the algorithm Consistency repeatedly applies all CFDs in $\Sigma$ to $\rho(\bar{x})$ (i.e., it "chases the tuple tableau") and each application of a CFD tries to instantiate an attribute of the tuple tableau with a constant. If at some point this causes a conflict, i.e., when an attribute in the tuple tableau is already instantiated with another constant, then it can be concluded that $\Sigma$ is not consistent for instances compatible with this specific finite domain valuation $\rho$. The algorithm then repeats the above for all other finite domain valuations in $V_{finattr(R)}$. If for some valuation the algorithm does not detect any conflicts during the chase, then $\Sigma$ will be consistent. If all valuations lead to conflicts during the chase, $\Sigma$ will be inconsistent.

The Chase Procedure

Let t be a tuple tableau over the attributes in attr(R) that consists of constants in the respective domains of the attributes and variables in vat.

For each $\phi\epsilon\Sigma$, the operation FD($\phi$) is defined that transforms t into a (new) tuple tableau t'. Assume that $\phi=(X\to A,t_p)$ and recall that $t_p[A]=a$ for some constant a in dom(A). Let $X_1=X$\finattr(R) and $X_2=X\cap$finattr(R). Consider the following cases:

(i) If $X_1\neq\emptyset$ and there exists an attribute $B\epsilon X_1$ such that $t_p[B]=b$ for some constant b, then let t'=t. Intuitively, since B is an attribute that has an infinite domain, t[B] can be set to be a constant that is different from 'b'. In this way, the left hand side of $\phi$ is not satisfied and thus $\phi$ does not impose any constraint on t.

(ii) Otherwise, i.e., either $X_1=\emptyset$ for all attributes $B\epsilon X_p$, $t_p[B]$='_', distinguish between two cases: (a) If $X_2=\emptyset$, then FD ($\phi$) instantiates t[A] with 'a'. Let t' be the result of this change. However, in case that t[A] is already given a constant different from a, then a conflict arises and t' is undefined (b) If $X_2\neq\emptyset$, then t'=t if t[$X_2|t_p[X_2]$. Indeed, in this case the left hand side of $\phi$ will never be satisfied and $\phi$ does not cause any additional constraints on t. However, if t[$X_2]=t_p[X_2]$, then FD ($\phi$) instantiates [A] with 'a'. Let t' be the result of this change. However, in case that t[A] is already a constant different from 'a', then a conflict arises and t' is undefined.

As a result, the application of FD($\phi$) on a tuple tableau t either results in a change of a variable into a constant, no change at all, or is undefined.

A chase of t is a sequence of tuple tableaus to $t_0, t_1, \ldots, t_n$ such that $t_0=t$, $t_i\neq t_{i+1}$, and such that $t_{i+1}$ is the result of applying FD($\phi$) for some $\phi\epsilon\Sigma$ on $t_i$. A successful chase of t is a chase $t_0, t_1, \ldots, t_n$ of t such that for any $\phi\epsilon\Sigma$, FD($\phi$)($t_n$)=$t_n$; that is, no fluffier changes can be induced.

Given a set $\Sigma$ of CFDs as input, Algorithm Consistency checks the consistency of $\Sigma$ as follows. For each possible valuation of the finite domain attributes, i.e., $\rho\epsilon V_{finattr(R)}$, we first initialize t=$\rho(\bar{x})$ (outer loop 2-14, lines 2-5), and then perform a chase of t (inner loop 6-13). There are two possible outcomes for such a chase: (a) either at some point FD($\phi$) is undefined (line 13); in this case, we exit the inner loop and set consistent to false; (b) otherwise the inner loop will perform a successful chase; in this case the algorithm returns true (the truth value of consistent will not be changed to false in the inner loop). If no successful chase is performed for any valuation, then the algorithm returns false (lines 14-15).

Given any set $\Sigma$ of CFDs on a relation schema R, the consistency of $\Sigma$ can be determined in $O(|\Sigma|^2)$ time, if either the schema R is predefined, or no attributes in $\Sigma$ have a finite domain.

Correctness

Suppose that Consistency($\Sigma$) returns true. Let $\rho\epsilon V_{finattr(R)}$ be the valuation for which this happens. Moreover, let t' be the result of the chase on $\rho(\bar{x})$. Denote by var(t') the set of attributes in t' that contain variables. Recall that the attributes in var(t') necessarily correspond to attributes in attr(R)–finattr (R). Instantiate these variables with constants not appearing in any pattern tuple in $\Sigma$. Denote the resulting tuple (now containing no variables anymore) by t". It can be shown that $\{t"\}$ $\Sigma$. Indeed, suppose that $\{t"\}/\phi$ for some CFD $\phi=(X\to, t_p)\epsilon\Sigma$. This can only happen when (i) $t_p[A]$ is a constant 'a', (ii) $t_p[X\backslash$finattr(R)] consists of '_' only, and (iii) t[$X\cap$finattr (R)]= $t_p[X\cap$finattr(R)]. In all other cases, $\{t"\}$ trivially satisfies φ. Moreover, {t"}/φ would imply that t"[A]≠a. However, this is impossible since by assumption, FD(φ)(t')=t' and thus t'[A] was already instantiated with 'a'. This is a contradiction since t" and t' agree on the attributes except those in var(t') (that includes A). Hence {t"} Σ.

If Σ is consistent, then Consistency(Σ) evaluates to true. Let I be a nonempty instance such that I Σ. Without loss of generality assume that I consists of a single tuple t. Let ρ∈ $V_{finattr(R)}$ be the valuation such that ρ($\bar{x}$)[finattr(R)])=t[finattr(R)]. Applying the chase of ρ($\bar{x}$) is successful, i.e., lines 6-13 in the algorithm Consistency do not set the variable consistent to false. Denote by $t_k$ the result of applying k FD-rules $t_0$= ρ($\bar{x}$). It is easily shown that $t_k$ agrees with t on all non-variable attributes of $t_k$. Suppose that the (k+1)th step is to be performed in the chase, and that FD(φ) is applied to $t_k$ for φ=(X→A,$t_p$) in Σ. Suppose by contradiction that this application is undefined due to a conflict. This implies that $t_p$[X]= [X] but $t_k$[A] (and thus also t[A]) is a constant different from $t_p$[A]. This is clearly impossible since {t} Σ and hence, t[A]= $t_p$[A]. As a result, the algorithm. Consistency will perform a successful chase on ρ($T_Σ$) and hence will return true, as desired.

Complexity Analysis

Algorithm Consistency basically consists of a nested loop: the outer loop over the set of valuations in $V_{finattr(R)}$, and the inner loop over the CFDs in Σ. Moreover, in each iteration, it applies a single FD rule to a single tuple tableau. Let fdom be the largest finite domain. Since $|V_{finattr(R)}|$= O(|fdom|$^{|finattr(R)|}$), the application of an FD rule takes O(|attr(R)|) time, and the inner loop is executed at most $|Σ|^2$ times in total, the overall time complexity is O(|fdom|$^{|finattr(R)|}$|Σ|$^2$|attr(R)|), where |fdom| is a constant. Observe that in case that all attributes have an infinite domain, the time complexity reduces to O(|Σ|$^2$|attr(R)|). Indeed, this follows from the fact that in this case, $V_{finattr(R)}$ only consists of the identity valuation and the outer loop will be executed only once. Note that if the schema R is predefined, the set $V_{finattr(R)}$ is a constant. In this case, the algorithm also takes O(|Σ|$^2$) time.

Implication Analysis of Conditional Functional Dependencies

In this section, the implication problem for CFDs is considered. The implication problem for CFDs is to determine, given a set Σ of CFDs and a single CFD φ on a relation schema R, whether or not Σ entails φ, denoted by Σ φ, i.e., whether or not for all instances I of R, if I Σ then I φ.

Two sets $Σ_1$ and $Σ_2$ of CFDs are equivalent, denoted by $Σ_1≡Σ_2$, if for any instance I, I $Σ_1$ if and only if I $Σ_2$.

It can be shown that the richer semantics of CFDs complicates the implication analysis: as opposed to standard FDs, the implication problem for CFDs is co NP-complete in general. An inference system is provided for the implication analysis of CFDs, as a nontrivial extension of Armstrong's Axioms for FDs. Based on these, an algorithm is presented for computing a minimal cover of a set of CFDs.

An Inference System for Conditional Functional Dependencies

Armstrong's Axioms for FDs are found in almost every database textbook, and are fundamental to the implication analysis of FDs. Analogous to Armstrong's Axioms, an inference system is provided for CFDs, denoted by I, in FIG. 4. Given a finite set Σ∪{φ} of CFDs, Σ⊢$_I$φ denotes that φ is provable from Σ using I.

While the rules FD1, FD2 and FD3 in I are extensions of Armstrong's Axioms for FDs, FD4 and FD5 do not find a counterpart in Armstrong's Axioms. Below the inference rules in I are illustrated.

FD1 and FD2 extend Armstrong's Axioms reflexivity and augmentation, respectively. A subtle issue in FD2 arises when B=A, when B appears in both the left hand side and tight hand side of the embedded FD [X, B]→A. If so, $t_p$[$B_L$]='_' is used instead of $t_p$[B]='_' to refer to the B attribute in [X, B] (recall that in a tuple $t_p$, the occurrences of B in the left hand side and right hand side can be distinguished by using $t_p$[$B_L$] and $t_p$[$B_R$], respectively).

FD3 extends transitivity of Armstrong's Axioms. To cope with pattern tuples that are not found in FDs, it employs an order relation ≺, defined as follows. For a pair $η_1,η_2$ of constants or '_', $η_1≺η_2$ if either $η_1=η_2$=a where a is a constant, or $η_2$='_'. The ≺ relation is naturally extended to pattern tuples. For instance, (a,b)≺(_,b). Intuitively, the use of ≺ in FD3 assures that ($t_1$[$A_1$], . . . , $t_k$[$A_k$]) is in the "scope" of $t_p$[$A_1$, . . . , $A_k$], i.e., the pattern $t_p$[$A_1$, . . . , $A_k$] is applicable. In Example 4.1, FD3 can be applied because $t_1$[B]=b≺ $t_2$[B]=_, where $t_1$, $t_2$ are the pattern tuples in $ψ_1,ψ_2$, respectively.

FD4 indicates that for a CF φ=([B, X]→A,$t_p$), if $t_p$[B]='_' and $t_p$[A] is a constant 'a', then it can be simplified by dropping the B attribute from the left hand side of the embedded FD. To see this, consider a relation I and any tuple t in I. Note that since $t_p$[B]='_', if t[X]=$t_p$[X] then t[B,X]=$t_p$[B,X] and t[A] has to be 'a' regardless of what value t[B] has. Thus, φ entails (X→A,$t_p$).

FD5 says that for an attribute B of a finite domain and with respect to a given set Σ of CFDs, if Σ implies ([X,B]->A,ti) when ti[B] ranges over all b in dom(B) such that (Σ,B=b) is consistent, then ti[B] can be "upgraded" to '_'. That is, for any instance I, if I satisfies Σ, then I also satisfies ([X,B]->A,tp), where tp[B]='_'. This is because for all sensible values of dom(B) that '_' in tp[B] may take, I satisfies ([X,B]->A,ti).

The inference system I is believed to be sound and complete for implication of CFDs.

It has been found that due to the richer semantics of CFDs, I is more complicated than Armstrong's Axioms. It is thus not surprising that the implication analysis of CFDs is mole intriguing than their standard FD counterpart. Indeed, the implication problem for CFDs is coNP-complete.

When the relation schema is predefined as commonly found in data cleaning applications, the implication analysis of CFDs can be conducted efficiently, as stated by the next result.

Given a set Σ of CFDs and a single CF φ defined on a schema R, whether or not Σφ can be decided in O((|Σ|+|φ|)$^2$) time, if either the schema R is predefined, or no attributes in Σ have a finite domain.

Computing Minimal Covers of CFDs

As an application of consistency and implication analyses of CFDs, an algorithm is presented for computing a minimal cover $Σ_{mc}$ of a set Σ of CFDs. The cover $Σ_{mc}$ is equivalent to Σ but does not contain redundancies, and thus is often smaller than Σ. Since the costs of checking and repairing CFDs are dominated by the size of the CFDs to be checked along with the size of the relational data, a non-redundant and smaller $Σ_{mc}$ typically leads to less validating and repairing costs. Thus finding a minimal cover of input CFDs serves as an optimization strategy for data cleaning.

A minimal cover $Σ_{mc}$ of a set Σ of CFDs is a set of CFDs such that (1) each CFD in $Σ_{mc}$ is of the form (R:X→A,$t_p$) as mentioned above, (2) $Σ_{mc}≡Σ$, (3) no proper subset of $Σ_{mc}$ implies $Σ_{mc}$, and (4) for each φ=(R:X→A,$t_p$) in $Σ_{mc}$, there exists no $\phi=(R:X'\to A,t_p[X'\cup A])$ in $\Sigma_{mc}$ such that $X \subset X'$. Intuitively, $\Sigma_{mc}$ contains no redundant CFDs, attributes or patterns.

Example 4.2

Let $\Sigma$ consist of $\psi_1,\psi_2$ and $\phi$ given in Example 4.1. A minimal cover $\Sigma_{mc}$ of $\Sigma$ consists of $\psi_1'=(\emptyset\to B,(b))$ and $\psi_2'=(\emptyset\to C,(c))$. This is because (1) $\{\psi_1,\psi_2\} \phi$ ((Example 4.1), (2) $\psi_1$ can be simplified to $\psi_1'$, by removing the redundant attribute A (by the rule FD4 in I), and (3) similarly, $\psi_2$ can be simplified to $\psi_2'$.

FIG. 5 provides exemplary pseudocode for an algorithm, MinCover, that computes a minimal cover. MinCover is an extension of a standard ED counterpart. First, MinCover checks whether or not $\Sigma$ is consistent (lines 1-2). If $\Sigma$ is consistent, it proceeds to remove redundant attributes in the CFDs of $\Sigma$ (lines 3-6). $(t_p[X-\{B\}],t_p[A])$ denotes the pattern tuple $t_p$ such that $t_p[A]=t_p[A]$ and $t_p[C]=t_p[C]$ for each $C \in X-\{B\}$. Next, it removes redundant CFDs from $\Sigma$ (lines 8-10). From the above discussion, it follows that MinCover is able to compute a minimal cover efficiently when the schema is predefined, in $O(|\Sigma|^3)$ time.

Detecting CFD Violations

A first step for data cleaning is the efficient detection of constraint violations in the data. In this section, techniques are provided to detect violations of CFDs. Given an instance I of a relation schema R and a set $\Sigma$ of CFDs on R, it is to find all the violating tuples in I, i.e., the tuples that (perhaps together with other tuples in I) violate some CFD in $\Sigma$. An SQL technique is provided for finding violations of a single CFD, and then the initial SQL technique is generalized to validate multiple CFDs. Finally, an incremental technique is provided for validating CFDs. It is desirable to use just SQL to find violations: this makes detection feasible in any standard relational DBMS without requiring any additional functionality on its behalf.

Checking a Single CFD with SQL

Consider a CFD $\phi=(X\to A,T_p)$. For simplicity, it is assumed that the right-hand side of a CFD consists of a single attribute only. The disclosed solutions can be trivially extended to multiple attributes, as it is illustrated in the various examples (where this assumption is not present). Given the CFD $\phi$, the SQL queries in FIG. 13 suffice to find the tuples violating $\phi$. In FIG. 13, for an attribute $B \in (X \cup A)$, $t[B]=t_p[B]$ is a short-hand for the SQL expression $(t[B]=t_p[B]$ or $t_p[B]='\_')$, while $t[B]=t_p[B]$ is a short-hand for $(t[B] \neq t_p[B]$ and $t_p[B] \neq '\_')$.

Intuitively, detection is a two-step process, each conducted by a query. Initially, query $Q_\phi^C$ detects single-tuple violations, i.e., the tuples t in I that match some pattern tuple $t_p \in T_p$ on the X attributes, but t does not match $t_p$ in A since the constant value $t_p[A]$ is different from $t[A]$. That is, $Q_\phi^C$ finds violating tuples based on differences in the constants in the tuples and $T_p$ patterns.

On the other hand, query $Q_\phi^V$ finds multi-tuple violations, i.e., tuples t in I for which there exists a tuple t' in I such that $t[X]=t'[X]$ and moreover, both t and t' match a pattern $t_p$ on the X attributes, value $t_p[A]$ is a variable, but $t[A] \neq t'[A]$. Query $Q_\phi^V$ uses the group by clause to group tuples with the same value on X and it counts the number of distinct instantiations in $t_p[A]$. If there is more than one instantiation, then there is a violation. Note that $Q_\phi^V$ returns only the X attributes of violating tuples. This has the advantage that the output is more concise than if the complete tuples are returned. Moreover, the complete tuples can be easily obtained using an additional SQL query.

Example 5.1

Recall CFD $\phi_2$ given in FIG. 2. Over a cust instance I, the SQL queries $Q_{\phi_2}^C$ and $Q_{\phi_2}^V$ shown in FIG. 6 determine whether or not I satisfies $\phi_2$. Executing these queries over the instance of FIG. 1, it returns tuples $t_1, t_2$ (due to $Q_{\phi_2}^C$), and $t_3$ and $t_4$ (due to $Q_{\phi_2}^V$).

A salient feature of the disclosed SQL translation is that tableau $T_p$ is treated an ordinary data table. Therefore, each query is bounded by the size of the embedded fd $X \to A$ in the CFD, and is independent of the size (and contents) of the (possibly large) tableau $T_p$.

Validating Multiple CFDs

A naive way to validate a set $\Sigma$ of CFDs is to use one query pair for each CFD $\phi$ in $\Sigma$. This approach requires $2 \times |\Sigma|$ passes of the underlying relation. An alternative approach is presented that only requires two passes. The key idea is to generate a single query pair to check all the constrains in $\Sigma$. The proposed solution works in two phases. In its first phase, the algorithm performs a lineal scan of all the pattern tableaus belonging to CFDs in $\Sigma$ and merges them, generating a single tableau called $T_\Sigma$. Intuitively, tableau $T_\Sigma$ is such that it captures the constraints expressed by all the tableaus of the CFDs in $\Sigma$. Then, in its second phase, the algorithm generates a query pair that finds tuples violating CFDs in $\Sigma$.

Merging Multiple CFDs

Consider a set $\Sigma$ which, without loss of generality, contains just two CFDs $\phi$ and $\phi'$ on R, where $\phi=(X\to A,T)$ and $\phi'=(X'\to A',T')$. For now, assume that neither A nor A' belong to $X \cup X'$. This assumption is removed later. There are two main challenges for the generation of the merged tableau $T_\Sigma$. The first challenge is that tableaus T and T' may not be union-compatible, i.e., $X \neq X'$ or $A \neq A'$. Thus, tableau T (resp. T') needs to be extended with all the attributes in $(X \cup A)-(X' \cup A')$ (resp. $(X' \cup A')-(X \cup A)$ for T'). For each attribute B in $(X \cup A)-(X' \cup A')$ and each tuple $t_p$ in the original tableau T, the value of $t_p[B]$ is set to be a special symbol denoted by '@', which denotes intuitively a "don't care" value. After this extension, the resulted tableaus are union-compatible. Then, tableau $T_\Sigma$ is defined to be their union FIG. 7 shows how the CFDs $\phi_2$ and $\phi_3$ of FIG. 2 can be made union-compatible.

Given the presence of '@' CFD satisfaction needs to be reformulated. Let $Z=X \cup X'$ and $W=A \cup A'$. Consider a tuple $t_p[Z,W]$ in tableau $T_\Sigma$ which includes '@'. Use $Z_{t_p}^{free}$ and $W_{t_p}^{free}$ to denote the subset of Z and W attributes of $t_p$ that is '@'-free, i.e., it has no '@' symbol A relation I of R satisfies the CFD $\phi_\Sigma$ whose tableau is $T_\Sigma$, denoted by $I \phi_\Sigma$, if for each pair of tuples $t_1,t_2$ in the relation I, and for each tuple to in the pattern tableau $T_\Sigma$ of $\phi_\Sigma$, if $t_1[W_{t_p}^{free}]=t_2[W_{t_p}^{free}] \odot t_p[W_{t_p}^{free}]$, then $t_1[Z_{t_p}^{free}]=t_2[Z_{t_p}^{free}] \odot t_p[Z_{t_p}^{free}]$.

For the second challenge, consider the detection of violations of a single CFD using SQL. Note that while writing the SQL queries, it assumes implicit knowledge of whether an attribute is part of the left-hand or right-hand side of the CFD. Now, consider two simple CFDs on R, namely, $\phi=(A\to B,T)$ and $\phi'=(B\to A,T')$. Suppose that the tableaus of the CFDs are union-compatible. One might want to take the union of these two tableaus to generate $T_\Sigma$. How violations of tableau $T_\Sigma$ be detected using SQL? Note that the method given in the previous section cannot be directly used Attribute A is in the left-hand side, for tuples coming from $\phi$, while it is part of the tight-hand side, for tuples coming from $\phi'$. Thus, it seems that the two sets of tuples must be distinguished and each set treated separately, something that counters the benefits of CFD merging.

This is addressed by splitting the tableau T of each CFD $\phi=(R:X\rightarrow A, T)$ into two parts, namely, $T^X$ and $T^A$, one tableau for the X and one for A attributes of $\phi$. Then, tableau $T_\Sigma^Z$ (and similarly $T_\Sigma^W$) is generated by making all the $T^X$ tableaus in $\Sigma$ union-compatible (similarly fox the $T^A$ tableau). Note that an attribute can appear in both $T_\Sigma^Z$ and $T_\Sigma^W$. To be able to restore pattern tuples from $T_\Sigma^Z$ and $T_\Sigma^W$, a distinct tuple id $t_p$[id] is created for each pattern tuple $t_p$, and associate it with the corresponding tuples in $T_\Sigma^Z$ and $T_\Sigma^W$. For example, consider CFD $\phi_3$ shown in FIG. 2 and $\phi_5=([CT]\rightarrow[AC],T_5)$, where $T_5$ consists of a single tuple (_,_). FIG. 8 shows their merged $T_\Sigma^Z$ and $T_\Sigma^W$ tableaus. Note that attributes CT and AC appear in both tableaus.

It has been found the CFD merging is mainly beneficial for highly-related CFDs. The conversion to DNF is not an option when handling where clauses in CNF, because each disjunct in CNF consists of three terms, and thus the translation of CNF to DNF results in a where cluser with $3^k$ conjuncts, where k is the number of attributes in the CFD. In practice, this is much worse then the $2^k$ increase that results from translating the queries $Q_\phi^C$ and $Q_\phi^V$ into DNF.

Query Generation

During the second phase, a single pair of SQL queries are generated for $T_\Sigma$. This query generation, however, introduces new challenges. Recall that query $Q_\phi^V$, for some CFD $\phi=(R:X\rightarrow A, T)$, requires a group by clause over all the X attributes. Now, consider tableau $T_\Sigma^Z$ in FIG. 8. It is not hard to see that if the group by clause is used over all the attributes in $T_\Sigma^Z$, all (if any) violations will not be detected since, for example, for the first three tuples in $T_\Sigma^Z$ the '@' in attribute CT indicates that, while detecting violations, only the first two attributes should be used for grouping and the value of attribute CT should be ignored. Similarly, for the last tuple in $T_\Sigma^Z$, the '@' in attributes CC and AC indicates that while detecting violations for these tuples, only the value of CT should be considered. The example suggests that the disclosed SQL query should change the set of group by attributes, based on the contents of each tuple. In what follows, it is shown how this can be achieved while still keeping the query size bounded by the size of the embedded FD Z→W in the merged tableau, and independent of the size of the merged tableau. Central to the disclosed approach is the use of the case clause of SQL (supported by popular DBMs like DB2, Oracle, MySQL).

Consider the merged tableaus $T_\Sigma^Z$ and $T_\Sigma^W$ from a set $\Sigma$ of CFDs over a relation schema R and let I be an instance of R. Then, the two SQL queries in FIG. 14 can be used to detect violating tuples of I violating $\phi$. In FIG. 14, each attribute $B_i \in Z$, $t[B_i]=t_p[B_i]$ now accounts for the '@' and is a short-hand for ($t[B_i]=t_p[B_i]$ or $t_p[B_i]='\_'$ pr $t_p[B_i]='@'$), while for each attribute $C_j \in W$, $t[C_{j]\neq t_p}[C_j]$ is a short-hand for ($t[C_j]\neq t_p[C_j]$ and $t_p[C_j]\neq '\_'$ and $t_p[C_j]\neq '@'$).

Note that query $Q_\Sigma^C$ is similar in spirit to the SQL query that checks for violations of constants between the relation and the tableau, for a single CFD. The only difference is that now the query has to account for the presence of the '@' symbol in the tableau. Now, consider the relation Macro which is of the same sort as $T_\Sigma^Z$ and $T_\Sigma^W$ (attributes are renamed that appear in both tableaus so as not to appear twice). Relation Macro is essentially the join on Z of relation I with the result of the join on tuple id $t_p$[id] of the two tableaus. The value of each attribute, for each tuple $t^M$ in Macro, is determined by the case clause. In more detail, for each attribute $B \in Z$, $t^M[B]$ is set to be '@' if $t_p^2[B]$ is '@', and is t[B] otherwise; similarly for each attribute $C \in W$ and $t^M[C]$.

Note that relation I is not joined on W with the tableaus. Thus, if for some tuple t with $t[Z]@t_p^Z[Z]$, there exists an attribute C with $t_p^W[C]$ a constant and $t[C]\neq t_p^W[C]$ (i.e., t is violating the merged tableau) then $t^M[C]$ is set to be [C]. This creates no problems to the process since this violating tuple is already detected by $Q_\Sigma^C$.

Intuitively, Macro considers each tuple in the tableau, and uses it as a mask over the tuples of the relation. If the tableau tuple indicates a don't care value for all attribute, all the (possibly different) attribute values in the relation tuples are masked and replaced by an '@' in Macro. FIG. 9 shows the result of joining the fourth tuple of tableaus $T_\Sigma^Z$ and $T_\Sigma^W$ in FIG. 8 with the cust relation of FIG. 1. Note that the query masks the attributes values of CC and AC. This masking allows the subsequent group by over X to essentially consider, for each tuple, only the subset of Z that does not have any don't care values. Note that although Z={CC,AC,CT}, the group by query $Q_\Sigma^V$ essentially performs a group by over only attribute CT. The query returns the NYC tuples which violate $\phi_5$.

In this way, a single pair of SQL queries are generated to validate a set $\Sigma$ of CFDs, while guaranteeing that the queries are bounded by the size of the embedded. FDs in $\Sigma$, independent of the size of the tableaus in $\Sigma$. Furthermore, to validate $\Sigma$ only two passes of the database is required.

Incremental CFD Detection

Consider an instance I of a relation schema R. For simplicity, consider a single CFD $\phi=(X\rightarrow A, T_p)$ (the incremental technique presented below can be extended to deal with multiple CFDs). Given the methodology presented thus far, violations of $\phi$ can be checked by issuing the pair of queries $Q_\phi^C$ and $Q_\phi^V$ over I. An interesting question is then what happens if the instance I changes? As tuples are inserted or deleted from I, resulting in a new instance $I^{new}$, a naive solution would be a batch approach that re-issues queries $Q_\phi^C$ and $Q_\phi^V$ over $I^{new}$, starting from scratch in response to updates, something that requires two passes of the underlying instance each time the queries are re-issued.

Intuitively, however, one expects that a tuple insertion leaves a large portion of instance I unaffected when CFD violations are concerned. An inserted tuple t might introduce new violations, but only with tuples that are already in the instance and which match t in the X attributes. Therefore, it makes sense to only access these tuples and only detect the possible newly introduced violations due to the inserted tuple. Thus, incremental detection can potentially save a large number of disk accesses, since instead of performing two passes of the underlying data on each tuple insertion (naive method), only the tuples that match the inserted tuple t in the X attributes need to be accessed. Similarly, in the case of deletion, by deleting a tuple t, some of the violations in I that the deleted tuple was causing might be inadvertently repaired (again with tuples matching t in the X attributes). Therefore, it makes sense to only detect which of the existing violations concerning the deleted tuple are affected. The following example better illustrates the above.

Example 5.2

Recall from Example 5.1 that tuples $t_1$ to $t_4$ in FIG. 1 violate CFD $\phi_2$. Now, consider inserting the tuple $t_7$: (01, 215, 3333333, Bill, Main Rd PHI, 02394) in the relation of the figure. It is easy to check that tuples $t_5$ and $t_7$ violate $\phi_2$ (due to $Q_{\phi_2}^V$). Still, the newly inserted tuple does not affect the violations detected between the first four tuples. Note that an incremental detection would require that we only access tuple $t_5$, instead of the whole relation.

Now, consider again the instance in FIG. 1 and assume that tuple $t_4$ is deleted from it. Then, it is easy to check that tuple $t_3$ no longer violates $\phi_2$ since the deletion of $t_4$ inadvertibly repaired the violation caused by tuples $t_3$ and $t_4$. At the same time, note that such a deletion only requires accessing tuple $t_3$ and does not affect the violation caused by tuples $t_1$ and $t_2$.

A method is presented to incrementally detect CFD violations, given a set of insertions and deletions to an instance I. Although the incremental method has the same worst-case performance as the naive method (two passes of the underlying instance), its expected performance is that only a small number of tuples are accessed, which will be verified in the next section by out experiments.

Logging of Violations

The incremental detection requires extension of the schema R of an instance relation I to record which tuples violate which CFDs in a given set $\Sigma$. In more detail, for each CFD $\phi \in \Sigma$ two Boolean attributes $\beta_\phi^C$ and $\beta_\phi^V$ are added to the schema of R. $R^{log}$ denotes the new schema. For each tuple t∈I, a tuple t' is created in $R^{log}$ such that $t'[attr(R)]=t[attr(R)]$. Furthermore, in attribute $t'[\beta_\phi^C]$ (resp $t'[\beta_\phi^V]$) it is recorded whether or not the corresponding tuple t violates CFD $\phi$ due to $Q_\phi^C$ (resp, $Q_\phi^V$). Note that the logging mechanism imposes minimum overhead, in terms of space, since for each tuple and each CFD only two additional bits are required.

It is assumed that, initially, queries $Q_\phi^C$ and $Q_\phi^V$ are executed and the result of the two queries is used to initialize the values of attributes $\beta_\phi^C$ and $\beta_\phi^V$, through a simple. SQL update statement of the form for $\beta_\phi^C$ (similarly for $\beta_\phi^V$) as shown in FIG. 15.

One needs only to select all those tuples with both $\beta_\phi^C$ and $\beta_\phi^V$ equal to false, for each $\phi \in \Sigma$, and then project on attr(R), in order to retrieve from $R^{log}$ the tuples that do not violate any of the CFDs. FIG. 10 shows the instance of FIG. 1 after its schema has been extended appropriately to log violations for CFD $\phi_2$.

Handling Tuple Deletions

SQL statements are used to detect violations, in an incremental fashion. Consider a CFD $\phi=(X \rightarrow A, T_p)$ and an instance $I^{log}$ whose schema $R^{log}$ includes attributes $\beta_\phi^C$ and $\beta_\phi^V$. In response to deletion of tuple t from $I^{log}$, the incremental detection of violations has two steps.

In more detail, the SQL query in the first step simply deletes from $R^{log}$ the tuple corresponding to t. The second step checks for tuples that (a) violate $\phi$ ($t'[\beta_\phi^V]=1$), (b) have the same values on the X attributes with t, and (c) all these identified tuples have the same A attribute value. It is easy to see that if a set of tuples satisfies the above three conditions, then each of the tuples in the set violated $\phi$ only due to t. Since t is deleted, each of the tuples now satisfies $\phi$. Therefore, $t'[\beta_\phi^V]$ is set to false. Note that a tuple deletion only affects violations that are caused by the presence of '_' in the tableau, hence the focus is only on the $\beta_\phi^V$ attribute. Also note that the above procedure need not access the pattern tableau $T_p$ of $\phi$, resulting in additional savings in terms of execution time.

Example 5.3

Consider the instance in FIG. 10 and assume that tuple $t_4$ is deleted. Then, the second step of the incremental detection will select tuple $t_3$ and set $t_3[\beta_{\phi_2}^V]$ to false since there is no other tuple in the instance that has the same values on the CC, AC and PN attributes as $t_3$ but differs from $t_3$ in STR, CT or ZIP. Hence, tuple $t_3$ no longer violates $\phi_2$. Note that the incremental detection, using appropriate indexes, only accesses tuple $t_3$. Contrast this with the non-incremental detection which requires to access the whole relation twice.

An interesting question is what happens for batch deletion, i.e., delete a set of tuples. Obviously, the above two steps could be executed once for each tuple in the set. It suffices to execute the above steps once for each distinct value of X attributes that is deleted. So, if, for example, both tuples $t_3$ and $t_4$ are deleted from the instance in FIG. 10, the two steps only need to be executed once since the two tuples have the same value on the X attributes. This simple observation provides additional savings.

Handling Tuple Insertions

To insert a tuple t into $I^{log}$, then, the incremental detection of violations has three steps, as shown in FIG. 16. The first step simply inserts the tuple t into relation $R^{log}$, where it is assumed that both the $\beta_\phi^C$ and $\beta_\phi^V$ attributes are set to false, for each newly inserted tuple. Similar to $Q_\phi^C$, the second step checks for violations in the constants between the recently inserted tuple and the pattern tableau $T_p$. If such violations exist, it sets the value of $\beta_\phi^C$ in the inserted tuple to true. Similar to $Q_\beta^V$, the final step checks for tuples that (a) have the same values on the X attributes with t, (b) differ from t on the A attribute, and (c) the inserted tuple t satisfies $\phi$ by itself. It is not hard to see that if the above conditions are satisfied, each identified tuple and t, when put together, violate $\phi$. Therefore, the value of the $\beta_\phi^V$ attribute of each such tuple is set to true. The notation is varied in this last step to also update, with the same statement, the value of the $\beta_\phi^V$ attribute of t to true.

Consider batch insertions involving a set of tuples, say $\Delta I^{log}$. Obviously, one might consider executing the above steps once for each tuple in $\Delta I^{log}$. An alternative strategy is to treat $\Delta I^{log}$ as an independent instance whose tuples must be merged with the ones in $I^{log}$. Consider the five different steps shown in FIG. 17, where $\Delta R^{log}$ denotes the schema of $\Delta I^{log}$, which is identical to $R^{log}$. During the first step, focus on the newly inserted tuples and identify which tuples independently violate $\phi$ due to $Q_\phi^C$. This is an unavoidable step whose cost cannot be reduced since each inserted tuple must be considered in isolation. However, by executing $Q_\phi^C$ only over $\Delta R^{log}$, re-detecting such violations over $R^{log}$ is avoided.

The second step looks for tuples in $R^{log}$ that were clean before the insertion of tuples in $\Delta R^{log}$ but will now violate $\phi$, once the tuples in $\Delta R^{log}$ are inserted. The tuples in $R^{log}$ that are affected by the insertion are such that they have the same values on the X attributes with some tuple in $\Delta R^{log}$ but their values differ on the A attribute.

The third step attempts to leverage the knowledge of violations in $R^{log}$ in order to detect violations in $\Delta R^{log}$. In more detail, if a tuple t' in $\Delta R^{log}$ has the same values on the X attributes with some tuple t" in $R^{log}$ whose $\beta_\phi^V$ is true, then t' must also have $\beta_\phi^V$ set to true. This is because for the tuples in $R^{log}$ with specific values on the X attributes it is known whether or not more than one values on the A attribute exist.

Finally, there is only one more case to consider, namely, whether there are any clean tuples in $\Delta R^{log}$ (with both $\beta_\phi^C$ and $\beta_\phi^V$ equal to false) that together with some other clean tuples in $\Delta R^{log}$ violate $\phi$. The last step detects such tuples by checking whether any tuples have the same values on the X attributes but different values on the A attribute. For all the detected tuples, the value of $\beta_\phi^V$ is set to true.

In last step, the tuples in $\Delta R^{log}$ are inserted into $R^{log}$.

Example 5.4

Consider the instance in FIG. 11 and assume that it is desired to insert its tuples to the instance in FIG. 10. Then, the first step above will set $t_7[\beta_{\phi_2}^C]$ to true, since the value of $t_7[CT]$ is "CHI" instead of "NYC". The second step will set $t_6[\beta_{\phi_2}{}^r]$ to true, since tuples $t_6$ and $t_9$ violate $\phi_2$. The third step will set $t_9[\beta_{\phi_2}{}^r]$ also to true, while none of the remaining steps will alter any tuples.

CFD Repairing

Discussion

To clean data, an effective method should be in place for removing inconsistencies from the date, in addition to inconsistency detection. That is, if a data base I of a relation schema R violates a set $\Sigma$ of CFDs on R, a minimal repair I' of I should be found such that I'|=$\Sigma$ and I' minimally differs from the original database I, obtained by performing repair operations on I. Attribute-value modifications are allowed as repair operations.

Repairing CFDs is nontrivial. Indeed, consider the CFD repairing problem, which is to determine, given I, $\Sigma$ and a positive integer k, whether or not there exists an instance I' of R such that (1) I'|=$\Sigma$ and (2) I' is obtained from J by at most k repair operations. This problem is intractable. The repairing problem is NP-complete.

Repairing CFDs introduces challenges not encountered when repairing standard FDs. For example, it is known that if a pair $t_1$, $t_2$ of tuples violate an FD X→A, one can resolve the inconsistency by modifying $t_1[A]$ or $t_2[A]$ such that $t_1[A]=t_2[A]$. That is, FD violations can always be resolved by modifying values of some $t_1$ (or$t_2$) attributes in the right hand side of FDs, without changing the left hand side such that at $t_1[X] \neq t_2[X]$. In contrast, this strategy no longer works for CFDs. To see this, consider a schema R with attr(R)=(A,B,C), an instance I of R consisting of $(a_1),(b_1),(c_1)$ and $(a_2),(b_2),(c_2)$, and a set $\Sigma$ of CFDs including (A→B,(−,−)) and (C→B, $\{(c_1,(b_1),(c_2,b_2)\})$. Then I_$\Sigma$ and moreover, any repair I' has to modify values of some attributes in the LHS of the FDs embedded in the CFDs.

A heuristic algorithm can be developed for finding a repair of a database, overcoming the new challenges.

FIG. 12 is a block diagram of a system 1200 that can implement the processes of the present invention. As shown in FIG. 12, memory 1230 configures the processor 1220 to implement the CFD consistency and violation detection methods, steps, and functions disclosed herein (collectively, shown as 1280 in FIG. 12). The memory 1230 could be distributed or local and the processor 1220 could be distributed or singular. The memory 1230 could be implemented as an electrical, magnetic or optical memory, or any combination of these or other types of storage devices. It should be noted that each distributed processor that makes up processor 1220 generally contains its own addressable memory space. It should also be noted that some or all of computer system 1200 can be incorporated into an application-specific or general-use integrated circuit.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can stole information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for determining whether a set of conditional functional dependencies are consistent, wherein said conditional functional dependencies comprise one or more constraints that data in a database must satisfy including at least one pattern with data values, said method comprising:
   obtaining a pattern tableau comprising a tableau tuple having a plurality of attributes including one or more finite domain attributes, wherein said one or more finite domain attributes are instantiated with a value, wherein said conditional functional dependencies hold on only a subset of said tableau tuples that satisfy said pattern in said pattern tableau;
   applying one or more of said conditional functional dependencies in said set to said pattern tableau to instantiate an attribute of said tableau tuple with a constant; and
   determining that at least two conditional functional dependencies are inconsistent when an attribute is instantiated with two different constants.

2. The method of claim 1, further comprising the step of repeating said method for possible values of said one or more finite domain attributes in said tableau tuples and wherein said applying step continues until no further changes are induced by the application of a conditional functional dependency to said pattern tableau.

3. A method for determining a minimal cover of a set of conditional functional dependencies, wherein said conditional functional dependencies comprise one or more constraints that data in a database must satisfy including at least one pattern with data values, said method comprising:
   determining whether said set of conditional functional dependencies is consistent, wherein said conditional functional dependencies hold on only a subset of tableau tuples in a pattern tableau that satisfy said pattern;
   removing redundant attributes in said set of conditional functional dependencies; and
   removing redundant conditional functional dependencies from said set of conditional functional dependencies.

4. The method of claim 3, wherein said step of removing redundant attributes further comprises the step of applying one or more chase rules based on Armstrong's Axioms.

5. A method for detecting a violation of one or more conditional functional dependencies in a set of conditional functional dependencies, wherein said conditional functional dependencies comprise one or more constraints that data in a database must satisfy including at least one pattern with data values, said method comprising:
- representing said one or more conditional functional dependencies in a pattern tableau value, wherein said conditional functional dependencies hold on only a subset of tableau tuples in a pattern tableau that satisfy said pattern;
- applying a first query to at least one of said conditional functional dependencies, wherein said first query detects one or more single-tuple violations, wherein a single-tuple violation comprises a tuple in said database that match a pattern tuple from said pattern tableau on a first set of attributes but does not match a second set of attributes due to a difference in one or more constant values; and
- applying a second query to at least one of said conditional functional dependencies, wherein said second query detects one or more multiple-tuple violations, wherein a multiple-tuple violation comprises at least two tuples in said database that agree on said first set of attributes and match a pattern tuple from a pattern tableau but said at least two tuples disagree on said second set of attributes.

6. The method of claim 5, wherein said first and second queries are SQL queries.

7. The method of claim 5, further comprising the step of merging a plurality of conditional functional dependencies.

8. The method of claim 5, further comprising the step of translating said pattern tableau to generate said first and second queries.

9. The method of claim 5, further comprising the step of repairing said detected one or more single-tuple and multiple-tuple violations.

10. A system for determining whether a set of conditional functional dependencies are consistent, wherein said conditional functional dependencies comprise one or more constraints that data in a database must satisfy including at least one pattern with data values, said sysem comprising:
- a memory; and
- at least one processor, coupled to the memory, operative to:
  - obtain a pattern tableau comprising a tableau tuple having a plurality of attributes including one or more finite domain attributes, wherein said one or more finite domain attributes are instantiated with a value, wherein said conditional functional dependencies hold on only a subset of said tableau tuples that satisfy said pattern in said pattern tableau;
  - apply one or more of said conditional functional dependencies in said set to said pattern tableau to instantiate an attribute of said tableau tuple with a constant; and
  - determine that at least two conditional functional dependencies are inconsistent when an attribute is instantiated with two different constants.

11. The system of claim 10, wherein said processor is further configured to repeat said steps of claim 10 for possible values of said one or more finite domain attributes in said tableau tuples and wherein said conditional functional dependency set are applied to said pattern tableau until no further changes are induced by the application of a conditional functional dependency to said pattern tableau.

12. The system of claim 10, wherein said processor is further configured to determine a minimal cover of a set of conditional functional dependencies by determining whether said set of conditional functional dependencies is consistent; removing redundant attributes in said set of conditional functional dependencies; and removing redundant conditional functional dependencies from said set of conditional functional dependencies.

13. The system of claim 12, wherein said redundant attributes are removed by applying one or more chase rules based on Armstrong's Axioms.

14. The system of claim 10, wherein said processor is further configured to detect a violation of one or more conditional functional dependencies in a set of conditional functional dependencies by representing said one or more conditional functional dependencies in a pattern tableau; applying a first query to at least one of said conditional functional dependencies, wherein said first query detects one or more single-tuple violations, wherein a single-tuple violation comprises a tuple in said database that match a pattern tuple from said pattern tableau on a first set of attributes but does not match a second set of attributes due to a difference in one or more constant values; and applying a second query to at least one of said conditional functional dependencies, wherein said second query detects one or more multiple-tuple violations, wherein a multiple-tuple violation comprises at least two tuples in said database that agree on said first set of attributes and match a pattern tuple from a pattern tableau but said at least two tuples disagree on said second set of attributes.

15. The system of claim 14, wherein said first and second queries are SQL queries.

16. The system of claim 14, wherein said processor is further configured to merge a plurality of conditional functional dependencies.

17. The system of claim 14, wherein said processor is further configured to translate said pattern tableau to generate said first and second queries.

18. The system of claim 14, wherein said processor is further configured to repair said detected one or more single-tuple and multiple-tuple violations.

* * * * *